United States Patent [19]

Holcomb

[11] 3,865,468

[45] Feb. 11, 1975

[54] HEAD-WORN TELESCOPIC VIEWING APPARATUS

[76] Inventor: Harry F. Holcomb, 6800 N. Eastern Ave., Oklahoma City, Okla. 73111

[22] Filed: Mar. 1, 1973

[21] Appl. No.: 337,086

[52] U.S. Cl.................. 350/146, 350/39, 350/183, 350/248
[51] Int. Cl.... G02b 25/00, G02b 7/08, G02b 15/12
[58] Field of Search ............ 350/145, 146, 248, 39, 350/183; 351/19, 20, 21

[56] References Cited
UNITED STATES PATENTS
3,458,246   7/1969   Krebs.................................. 350/146
FOREIGN PATENTS OR APPLICATIONS
1,147,455   4/1969   Great Britain........................ 350/39

Primary Examiner—Paul A. Sacher
Attorney, Agent, or Firm—Karl W. Flocks

[57] ABSTRACT

A head-worn telescopic viewing apparatus for use in the performance of surgery or other operations requiring moderate magnification, said apparatus comprising a lens system adaptable to being selectively adjusted between high and low power magnification at the will of the wearer, said lens system including a plurality of lens elements selectively movable into the user's line of vision to form at least one eye lens and one field lens, said lens elements being selectively movable by foot actuated control means.

8 Claims, 7 Drawing Figures

HEAD-WORN TELESCOPIC VIEWING APPARATUS

BACKGROUND OF THE INVENTION

1. Field of the invention

The present invention relates to a head-worn viewing apparatus embodying a telescopic lens system providing alternate high and low power magnification and is particularly useful in the field of surgery.

2. Description of the prior art

Head-worn viewing apparatuses embodying multi-power magnification are known per se as exemplified, for example, by U.S. Pat. No. 3,458,246 (Krebs).

The head-worn, multi-power magnification viewing system, known heretofore, although selectively adjustable to an alternate power, is shown to be manually adjustable. In the field of surgery the necessity of manually adjusting various apparatuses poses several undesirable problems, among which are (a) requiring the surgeon to lay down his instruments; and (b) requiring the resterilization of the surgeon's hands.

SUMMARY OF THE INVENTION

The present invention comprises a new and improved multi-power viewing apparatus. In accordance with the present invention a head-worn telescopic viewing apparatus is provided whereby the wearer is afforded greater flexibility of movement.

It is another object of this invention to provide an apparatus with multiple power to enable its user to perform various tasks which otherwise would be very difficult or impossible with the naked eye.

It is additionally an object of this invention to provide a viewing apparatus having a wide enough field of vision to be compatible with maximum comfort and relaxation of the user.

It is further an object of this invention to provide a multi-power telescopic apparatus in which the user may selectively change the power of the apparatus without the use of his hands.

In carrying out the concept of the present invention a telescopic viewing device for delicate surgery or other jobs requiring moderate magnification an apparatus embodying at least one lens system is attached either to spectacle frames or to a headband type of support. The means of attachment to the head is not a part of the invention, but the apparatus is intended to be worn on the head as opposed to being supported on a stand. The Galilean telescopic principle is used to keep the weight of the apparatus low enough so that it may be worn on the head, and to allow the operator to alternate at will between a higher magnification with smaller field and a lower magnification with larger field. This is made possible by enabling him to alternately switch into his field of vision one of two different binocular telescopes: one with a longer focal length or one with shorter focal length. The two telescopes are arranged with some elements in common and mounted in such a way that the working distance does not change in switching from one to the other. Furthermore, they are aligned so that there is no shift of the image when switching telescopes. Therefore, the operator is able to alternate between the two as frequently as he desires without moving his head or his eyes, or changing focus of his eyes. This arrangement combines the advantages of wider field (with the lower power) and the higher power of the longer telescope.

DESCRIPTION OF THE PREFERRED EMBODIMENT

Figure 1:
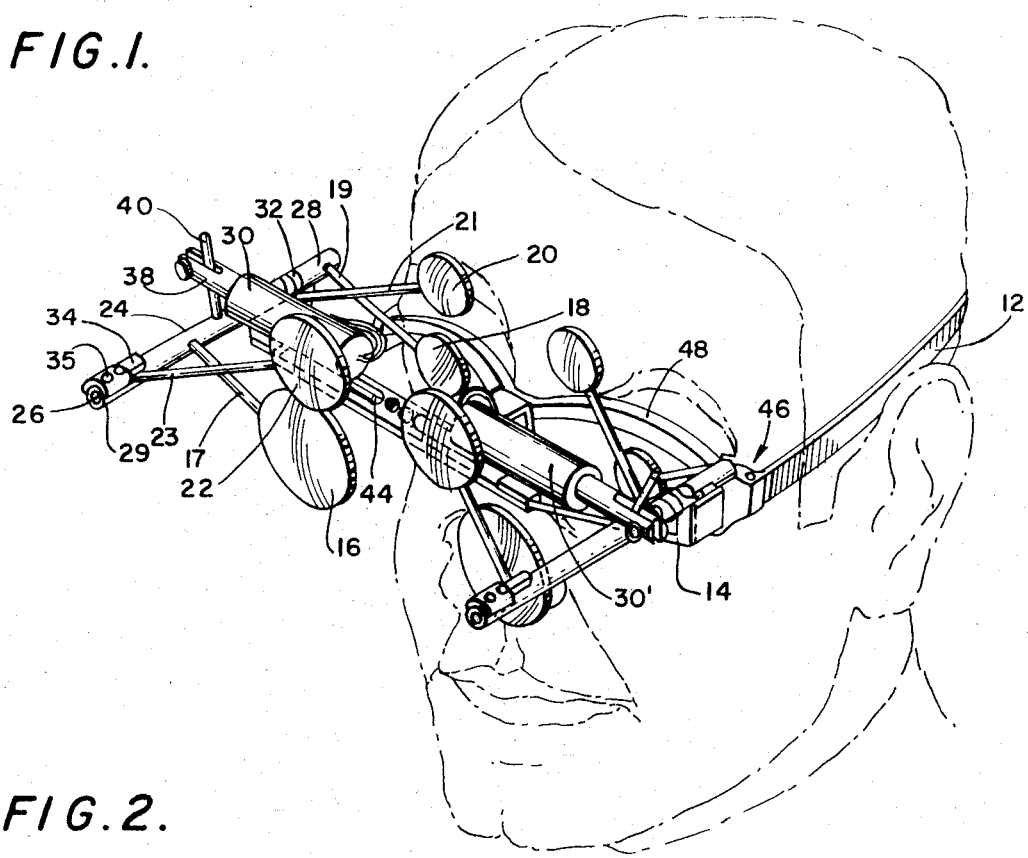
FIG. 1 shows a view in perspective of a head-worn telescopic viewing apparatus according to the present invention.
Figure 2:
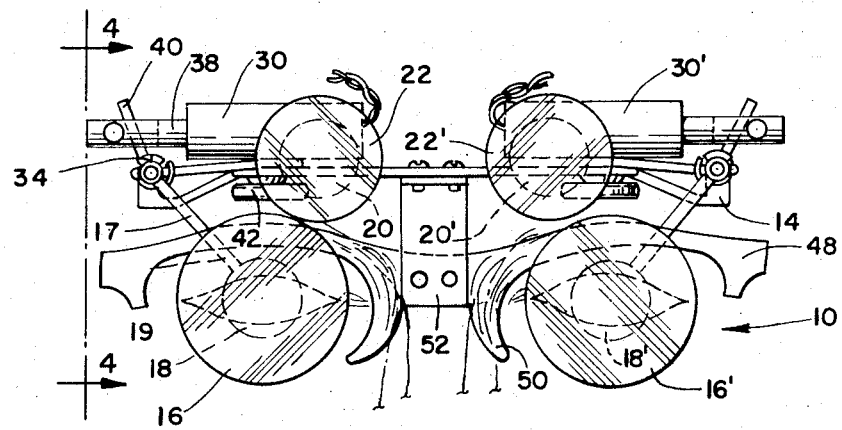
FIG. 2 shows a front elevational view of the viewing apparatus of FIG. 1 with the lens system in low power position.
Figure 3:
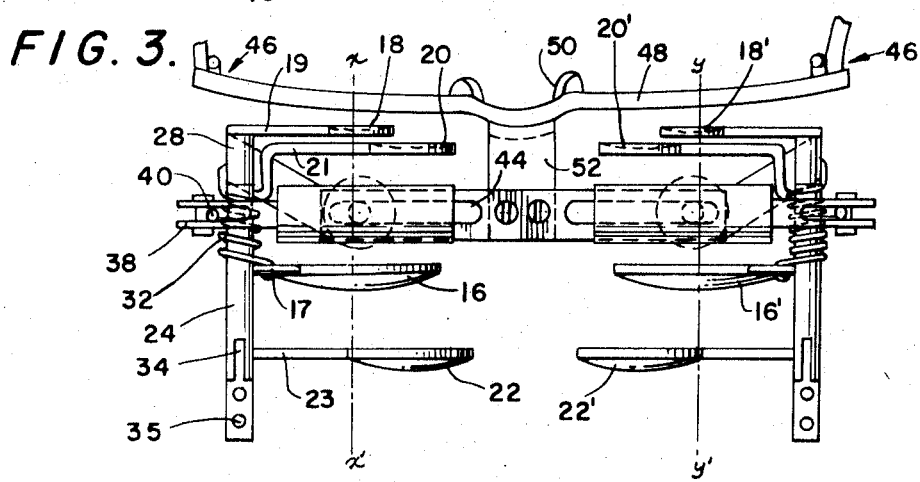
FIG. 3 is a plan view of the viewing apparatus shown in FIG. 2.
Figure 4:
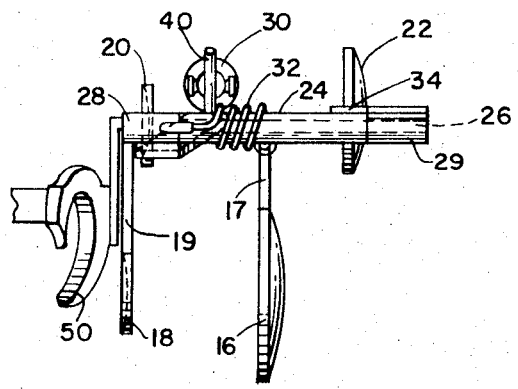
FIG. 4 shows an elevational view of the viewing apparatus of FIG. 3 looking in the direction of the arrows along the line 4—4.

Referring now more particularly to the drawings, the novel telescopic viewing apparatus according to the present invention is generally designated by the reference numeral 10 and comprises a headband 12 adaptable to being placed around the back of the user's head. The apparatus 10 comprises a main support frame 14 upon which a plurality of lenses 16, 18, 20 and 22 are supported. The lenses 16, 18, 20 and 22 are part of a lens system which provides high and low power magnification for the right eye, for example, of the user. A second set of lenses 16', 18', 20' and 22' may be provided for the user's other eye and as shown in FIG. 1 are arranged in mirror-like relationship with respect to and correspond to the lenses 16, 18, 20 and 22. As the structural arrangement of the two lens systems are substantially identical, a detailed description will be given of only one of the lens systems.

Each of the lenses 16, 18, 20 and 22 are secured to the free end of a support arm 17, 19, 21 and 23, respectively. Support arms 17, 21 and 23 are fixedly secured to a hollow sleeve 24 which surrounds and rotates about an axle 26. Support arm 19 of lens 18 is fixedly secured to an extension 28 at one end of the axle 26. At the other end of axle 26 an extension 29 has an abutment 34 which is adjustably fixed thereon by set screws 35.

A solenoid 30 is adjustably secured to main frame 14 by lock screw 42 passing through slot 44. A coil spring extends around sleeve 24 with one end fixed to projection 28 and the other end around support arm 17 to normally bias the lens elements to the low power magnifying position. As illustrated support arm 19 which is fixed to projection 28 at the end of axle 26 is normally held in a fixed position with lens 18 in viewing position. The spring 32 normally urges sleeve 24 to rotate to the position set for lens 16 to be in alignment with lens 18 which provides a low power magnification. Lenses 20 and 22 which are in alignment with each other are out of alignment with lens 16. Solenoid 30 is provided to switch the lens system from the low power magnification to the high power magnification condition. It is clear that upon actuation of the solenoid 30, for example by stepping on the foot switch 36 plunger 38 will move inwardly of the solenoid thereby moving lever 40, which extends radially from sleeve 24, to the right thus rotating sleeve 24 and swinging lens 16 out of the line of vision and lenses 20 and 22 into alignment with fixed lenses 18 against the bias of spring 32. The limit of rotation and thus the resting position of lenses 16, 20 and 22 is determined by stop 34 attached to projection 29. When the support arm 23 strikes abutment 34 further rotation thereof is prevented. The position of abutment 34 may be set to any of several desired positions by rotating about axle 26 and then tightening the set screws 35 to secure abutment 34 in the desired location. With sleeve 24 rotated to its resting position by spring 32 as limited by abutment 34 the low power scope comprises lenses 16 and 18.

Figure 7:
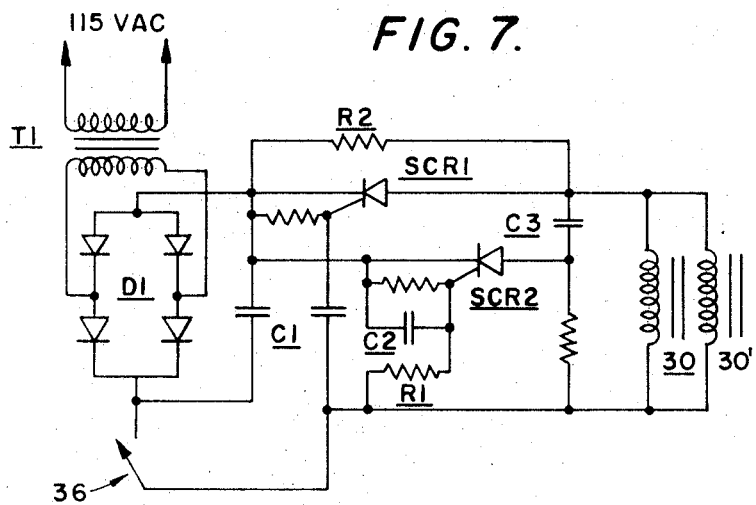
FIG. 7 shows electrical circuitry whereby the lens system according to the present invention may be selectively adjusted from high to low power magnification and vice-versa.

Electrical circuitry is shown in FIG. 7 whereby the lens apparatus according to this invention may be selectively adjusted from the low power magnification to its high power magnification. A 115 volt AC power supply is converted to a 24 volt AC by transformer T1 to drive solenoids 30 and 30' rated 12 volts DC intermittent duty. Twenty-four volts DC is provided by rectifier D1. When the operator closes foot switch 36, a pulse is generated through C1 at the gate of SCR1, turning it on and presenting full power of 24 volts to solenoids 30 and 30'. This provides ample power for actuating the solenoids and switching quickly from low to high power scopes. Three hundred to 500 milliseconds later, depending on the time constant of R1 and C2, a voltage is developed on the gate of SCR2 sufficient to trigger SCR2. When this occurs C3 is discharged across SCR1 and turns it off by commutation. With SCR1 turned off, R2 bypasses sufficient current, equal to 25% or less of the rated current of solenoids 30 and 30' in parallel, to hold the solenoids in the actuated position indefinitely without their overheating. Upon release of switch 36 power is removed from the driver circuit and both solenoids are deactivated, returning the device to the low magnification.

As seen in FIGS. 1–4 the apparatus is arranged with the lens system in low power condition. The low power scope is comprised of lenses 16 and 18 which form a Galilean telescope. The focal length is chosen to provide the desired magnification, usually 1.5 to 2.0 diameters based on a standard unaided eye working distance of 0.25 meters. Magnification $= 0.25/f$, where 0.25 is the standard working distance and $f$ is the focal length of the telescope, in meters. The actual working distance of the telescope is chosen for maximum comfort of the operator and depends on the back focal length ($f'_B$) which is the distance from the object to the field lens (the lens nearest the object, 16 in the case of the low power scope, 22 in the case of the higher powered scope). $f'_B$ may vary from 20 cm. to 30 cm. depending on the preference of the designer. M and $f'_B$ are determined by the focal lengths of negative lens 18 and positive lens 16, and by the distance between the two lenses. Standard lens equations are used to calculate these quantities.

Figure 6:
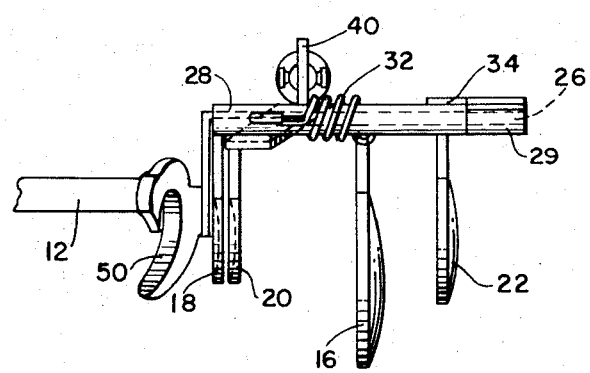
FIG. 6 is an elevational view of the viewing apparatus illustrated in FIG. 5 looking in the direction of the arrows along line 6—6.
Figure 5:
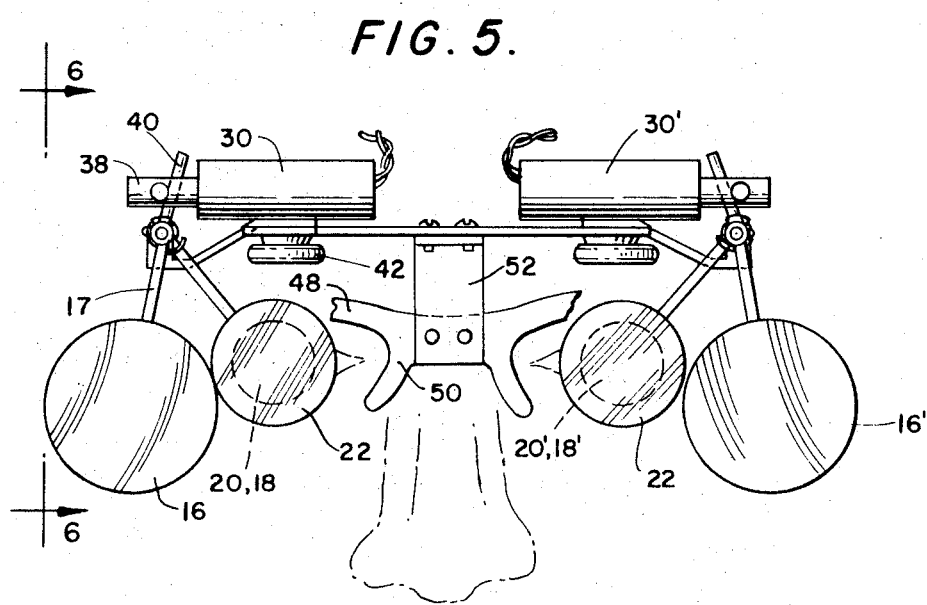
FIG. 5 is a front elevational view of the viewing apparatus according to the present invention with the lens system in high power position.

In FIGS. 5 and 6 the apparatus is set with the higher power scope in position which comprises lenses 18, 20 and 22. In the higher power scope the eye lens (the lens nearest the operator) is formed by a combination of negative lenses 18 and 20, and 22 is the field lens. Lens 16 is swung laterally out of line of sight. The back focal length of the higher power scope is chosen to give the same distance from operator's eye to object as with the low power scope. The magnification (M) is set between 4.0 and 5.0 diameters. The field size is finally determined by the diameter of the field lens in each scope, and this is made as large as possible consistent with an undistorted image. Distortion is minimized also by observing known optical principles in the design of the telescopes.

In choosing the power of the eye lens for each scope it is assumed that the eye of the operator contributes +1.5 diopters by its natural tendency to accommodate for near vision when the eyes are converged. In operators with presbyopia some of this power is added by the spectacle lens. The total accommodation of the unaided eye viewing an object at a normal working distance of ⅓ meter is 3.0 diopters, but only half this amount is assumed in the design of the telescopes to give the operator's eyes some rest when working at close distances for extended periods, and to permit the use of an intermediate aid in the spectacle lenses of presbyopic operators to give them good vision beyond the working range of the telescope when looking around the telescope through their spectacles. The total power of the eye-spectacle combination is compensated in the design of the high and low power scopes by giving the eye lens of each scope 1.5 diopters less power than called for by the calculations. The axes of the right and left scopes can be aligned horizontally and the adjustment can be made for the operator's interpupillary distance by means of screw 42 which holds solenoid 30 on frame 14. By loosening screw 42 solenoid 30 and sleeve 24 can be moved as a unit within slot 44 to make the proper adjustments. Prior to use, the operator adjusts the distance between the right and left eye lenses to match his own interpupillary distance, then he adjusts centerline axis $x$—$x'$ of the right scope and $y$—$y'$ of the left scope to intersect at the object point. These adjustments can be made visually with the device in place on the operator's head and need not be repeated.

Frame 14 is connected to a headband 12 or spectacle frame in such a way as to allow some adjustment of the vertical alignment of the device as a whole. In the illustrated embodiment of the present invention headband 12 which extends around the user's head is connected to frame by way of pivotal connections at opposite ends 46 thereof to a frontal strut 48. Strut 48, for comfort of the wearer and stability of the apparatus, includes a bridge portion 50 adapted to straddle the user's nose. An angle connecting plate 52 is shown to rigidly connect bridge portion 50 of strut 48 to frame 14 in the central area thereof in the vicinity of the adjacent ends of slots 44.

Strength and lightness are important considerations in the mechanical design of the device and materials are chosen accordingly. The use of linear solenoids as opposed to rotary solenoids, or other appropriate small, light, electromechanical transducers for driving the lens is a permissible design variation within the scope of this invention, as is the use of an appropriate small transducer operating on compressed gas supplied by suitable tanks or compressors and controlled by a foot actuated valve. The invention is basically concerned with the concepts of a lightweight binocular head-worn magnifying viewing system with magnification variable during use by the operator, involving discrete lens changes and fulfilling the purposes and requirements set forth above.

It is to be understood that while one preferred embodiment of the present invention has been illustrated and described herein, numerous variations and modifications therein may occur to those having skill in this art and what is intended to be covered herein is not only the illustrated form of the invention, but also any and all modified forms thereof as may come within the spirit of said invention.

What is claimed is:

1. A head-worn viewing apparatus for use in the performance of surgery or other operations requiring moderate magnification and allowing freedom of a user's hands for various tasks of the operation comprising in combination a group of eye lens elements and a group of field lens elements mounted on a frame to be worn on the head of the user wherein said group of eye lens elements includes at least two lenses, one of which is normally fixed in a viewing position and a second of which is supported on a rotatable arm, said group of field lens elements includes at least two lenses which circumferentially spaced from each other and are each supported on a rotatable arm whereby at least one of said field lens elements is selectively adjustable to a viewing position to form a relatively low power telescope with said eye lens element fixed in viewing position and others of said eye and field lens elements are selectively adjustable to said viewing position to form a relatively higher power telescope with said eye lens element fixed in viewing position, power means actuatable to automatically adjust said lens elements into said viewing position, and a foot control member for actuating said power means, and each of said rotatable arms are fixedly secured to a common rotatable member so that upon actuation of said power means by said foot control member each of said rotatable arms and the lens element supported thereon is simultaneously rotated.

2. The apparatus as recited in claim 1 wherein said common rotatable member upon which each of said rotatable support arms are fixedly secured comprises a hollow sleeve rotatable about an axle fixed upon said frame and wherein means are provided for constantly urging said sleeve in a direction toward indexing said at least one of said field lens elements with said normally fixed eye lens elements and to thereby form said relatively low power telescope.

3. The apparatus as recited in claim 2 wherein said hollow sleeve includes a radially projecting lever which may be urged in a direction to adjust said rotatable lens elements so that said second eye lens and the other of said field lens elements are urged to said viewing position and thereby form said relatively higher power telescope, said lever being selectively urged by said power means.

4. The apparatus as recited in claim 3 wherein said power means comprises a solenoid unit secured upon said frame and said solenoid including a plunger with slot adjacent the free end thereof into which said lever projects and is selectively urged thereby upon actuation of said solenoid by foot control means.

5. The apparatus as recited in claim 4 wherein said solenoid acts in a direction counter to means constantly urging said sleeve.

6. The apparatus as recited in claim 5 wherein said relatively higher power telescope comprises both of said eye lens elements and the other of said field lens elements.

7. The apparatus as recited in claim 6 wherein abutment means are adjustably secured on one end of said axle to limit the rotation of said hollow sleeve and lens elements rotatably supported thereon.

8. The apparatus as recited in claim 7 wherein each of said lens elements is part of a binocular system and corresponds with similarly arranged elements for a user's other eye.

* * * * *